United States Patent [19]

Kanno et al.

[11] Patent Number: 4,484,498
[45] Date of Patent: Nov. 27, 1984

[54] QUICK-CHANGE TOOL

[75] Inventors: Shigeyuki Kanno; Hajime Matsubara, both of Kawasaki, Japan

[73] Assignee: Toshiba Tungaloy Co., Ltd., Kawasaki, Japan

[21] Appl. No.: 543,055

[22] Filed: Oct. 18, 1983

[30] Foreign Application Priority Data

Oct. 19, 1982 [JP] Japan .................. 57-183365
Jan. 26, 1983 [JP] Japan .................. 58-9618[U]

[51] Int. Cl.$^3$ ............... B23B 29/00; B23P 15/28; B26D 1/00; B26D 3/00
[52] U.S. Cl. ................... 82/36 B; 407/112
[58] Field of Search ........... 82/36 B, 36 R; 407/98, 407/112

[56] References Cited

U.S. PATENT DOCUMENTS 30,548 10/1860 Stevens .................. 407/112
862,809 8/1907 Conklin .................. 407/112
1,409,719 3/1922 Hunt .................... 407/112

FOREIGN PATENT DOCUMENTS 54104 1/1980 Japan .

Primary Examiner—Leonidas Vlachos
Assistant Examiner—William Terrell
Attorney, Agent, or Firm—Fleit, Jacobson, Cohn & Price

[57] ABSTRACT

A quick-change tool comprises a shank assembly and a cutting head cartridge detachably mounted on the shank assembly. The cartridge supports a cutting insert and is provided with a receptacle on the rear end thereof. The shank assembly comprises a shank body having an axial bore and a draw bar slidably held in the axial bore. The draw bar is provided with a plug on its front end. The shank body is provided with a step-like extension extending forwardly from the lower part of its front end surface below the axial bore. A key adapted to be snugly received between a pair of laterally opposed walls on the cartridge is fixed to the step-like extension. The receptacle is formed of laterally opposed side walls and a cross bar connecting the upper ends of the side walls. Laterally elongated upper abutment surfaces are formed on the rear end surface of the cross bar portion and on the front end surface of the shank body. Laterally elongated lower abutment surfaces are formed on the front end surface of the step-like extension and the rear end of the cartridge. When the cartridge is fixed to the shank body the upper abutment surfaces abut each other, the lower abutment surfaces abut each other and the receptacle rests on the step-like extension with the key received between the walls.

17 Claims, 10 Drawing Figures

QUICK-CHANGE TOOL

BACKGROUND OF THE INVENTION

1. Field of the Invention

This invention relates to a cutting tool, and more particularly to a quick-change cutting tool comprising a head portion supporting thereon a cutting insert or a tip having a cutting edge, and a shank portion on which the head portion is detachably mounted.

2. Description of the Prior Art

In the past, cutting tools were of one piece, i.e., a cutting edge was integrally formed on one end of a shank. Such a one-piece cutting tool is fixed to a machine such as a lathe at the other end portion of the shank. The one-piece cutting tool is disadvantageous in that the cutting tool must be indexed so that the cutting edge is correctly positioned with respect to the workpiece each time the tool is changed. Therefore, the tool changing operation requires a long time and adds to the processing cost of the workpiece.

Thus there has been proposed a cutting tool comprising a holder having a shank portion and a head portion, and a cutting insert which is received in a locator formed in the head portion and is detachably fixed therein. The cutting tool of this type is advantageous in that the cutting insert can be changed without removing the holder from the machine and the new cutting insert can be indexably or replaceably located with respect to the workpiece by the locator, whereby the time required to change the tool can be shortened. However when cuttings remain in the locator, the locator cannot properly function and therefore cuttings or chips must be completely removed from the locator in order to precisely locate the cutting insert with respect to the workpiece. This prevents substantial reduction of the tool changing time and limits the possibility of the tool's being changed by an automated system.

There has been proposed a cutting tool comprising a cutting head cartridge supporting thereon a cutting insert and a shank assembly which are releasably secured together by way of a joint. In this cutting tool, the cutting insert is changed along with the cartridge without removing the shank assembly from the machine. Therefore the cutting insert can be indexed with respect to the workpiece by properly locating the cartridge with respect to the shank assembly under the guidance of guide means in the joint. Since the joint is remote from the cutting edge of the cutting insert, the adverse affect of cuttings is not so significant in this tool, whereby the tool changing time can be substantially shortened. The cutting tool of this type is generally referred to as a "quick-change tool".

An example of a quick-change tool is disclosed in Japanese Unexamined Patent Publication No. 55(1980)-54104. The quick-change tool disclosed in this Japanese Unexamined Patent Publication comprises a cutting head cartridge and a shank assembly. The cutting head cartridge comprises a cartridge body and a cutting insert detachably mounted on the cartridge body. The cartridge body is provided with a receptacle portion on the rear end portion, the receptacle portion forming a part of the joint for detachably connecting the cutting head cartridge and the shank assembly. The shank assembly comprises a shank body having an axial bore and a draw bar member slidably received in the axial bore of the shank body. The draw bar member is provided on the front end with a plug portion which forms the joint together with the receptacle portion of the cutting head cartridge. The receptacle portion of the cartridge is in the form of a backwardly projecting channel member having a vertical groove which is substantially cylindrical in shape and opens backwardly through a slot narrower than the diameter of the groove. The plug portion of the draw bar member is in the form of a vertically extending enlarged cylindrical portion the diameter of which is smaller than that of the vertical groove of the receptacle portion and which is connected to the body of the draw bar member by way of a neck portion having a width slightly smaller than that of the slot of the receptacle portion. A vertically extending recess is formed in the front end face of the shank body and the front end of the axial bore from which the plug portion projects opens in the base of the recess. When the cartridge is mounted on the shank assembly, the draw bar member is drawn backwardly with the plug portion being received in the receptacle portion, whereby the receptacle portion of the cartridge is drawn into the recess in the front end face of the shank body with its rear end face being pressed against the base of the recess and at the same time the slot of the receptacle portion is resiliently expanded by way of the abutment between the inner surface of the groove adjacent to the slot and the outer surface of the plug portion adjacent to the neck portion. In this position, the lower surface of the receptacle portion rests on shoulders formed on opposite side walls of the recess of the shank body. Thus the cartridge is located with respect to the shank body axially by the abutment between the rear end face of the receptacle portion and the base of the recess, vertically by the abutment between the lower surface of the receptacle portion and the shoulders, and laterally by the resilient force of the side walls of the receptacle portion. The quick-change tool of the Japanese Unexamined Patent Publication identified above is satisfactory insofar as it permits quick change of the tool or the cutting head cartridge. However it has drawbacks in that the mounting rigidity or the rigidity of the joint portion of the cartridge and the shank assembly when the cartridge is mounted on the shank assembly is not sufficient especially in the direction of the principal component of the force exerted on the cutting insert during a cutting operation, and since the side walls of the receptacle portion must resist the expanding force exerted thereon, the thickness of the side walls must be large, which adds to the overall width of the tool. Further since the joint portion is exposed, chips may sometimes enter the joint portion to interfere with correct location of the cartridge with respect to the shank body.

SUMMARY OF THE INVENTION

In view of the foregoing observations and description, the primary object of the present invention is to provide a quick-change tool which comprises a cutting head cartridge and a shank assembly and in which the cutting head cartridge can be easily and rigidly fixed to the shank assembly.

Another object of the present invention is to provide a quick-change cutting tool in which the cutting head cartridge can be precisely located with respect to the shank assembly.

Still another object of the present invention is to provide a quick-change cutting tool which can effectively prevent cuttings from entering the joint portion between the cutting head cartridge and the shank assembly.

Still another object of the present invention is to provide a quick-change tool which may be small in size especially in width for a given strength requirement.

The quick-change tool of the present invention comprises a cutting head cartridge and a shank assembly on which the cutting head cartridge is detachably mounted. The cutting head cartridge comprises a cartridge body and a cutting insert fixed to the cartridge body. The cartridge body is provided with a receptacle portion on the rear end thereof. The receptacle portion is like a gate in shape and includes a pair of opposed side walls spaced from each other and a cross bar portion connecting the upper end portions of the side walls. The gate-like receptacle portion is provided with a cap groove formed along the inner periphery thereof and extending from the lower end surface of one side wall to the lower end surface of the other side wall via the inner surface of one side wall, the lower surface of the cross bar portion and the inner surface of the other side wall. The forwardly facing rear side inner surface of the cap groove is flat and extends in a vertical plane. The shank assembly comprises a shank body having an axial bore and a draw bar member slidably held in the axial bore. The draw bar member is provided with a plug portion at the front end thereof. The plug portion is in the form of a flat enlarged portion having a thickness smaller than the width of the cap groove of the receptacle portion and having a width larger than that of the entrance of the gate-like receptacle portion. The enlarged portion is connected to the body portion of the draw bar member by way of a neck portion slightly thinner than the width of the entrance of the receptacle portion. The enlarged portion or the plug portion has a flat rear surface which is adapted to engage with the rear side inner surface of the cap groove in plane-to-plane contact. At the upper part of the front end surface of the shank body is formed an upper abutment surface adapted to be engaged with an upper abutment surface on the rear end surface of the cross bar portion of the receptacle portion in plane-to-plane contact. The abutment surfaces are generally vertical, though this is not absolutely necessary. A step-like extension projects forwardly from the front end of the shank body at the lower part thereof. The step-like extension has an upper surface extending substantially horizontally and a flat front end surface extending substantially vertically. The front end surface forms a lower abutment surface adapted to be engaged with a lower abutment surface formed on the rear end portion of the cartridge body in plane-to-plane contact. The front end of the axial bore opens between the upper abutment surface and the lower abutment surface. The draw bar member is axially moved back and forth by rotating a nut, for example, which is meshed with a threaded rear portion of the draw bar member. A key member is fixed to the step-like extension and a pair of opposed wall means laterally spaced from each are provided on the rear end portion of the cartridge body to snugly receive therebetween the key member to locate the cartridge body with respect to the shank body. In one embodiment of the present invention, the wall means comprises the side walls of the receptacle portion.

When the cutting head cartridge is connected to the shank assembly, the cartridge is moved downwardly so that the plug portion of the draw bar member is received in the cap groove and the neck portion is received in the entrance of the receptacle portion. Then the draw bar member is drawn rearwardly to pull the cartridge rearwardly by way of the engagement between the receptacle portion and the plug portion, whereby the cartridge is pressed against the shank body with the upper abutment surfaces abutting against each other, the lower abutment surfaces abutting against each other, the key member snugly received between the wall means of the receptacle portion and the receptacle portion resting on the upper surface of the step-like extension of the shank body.

In the quick-change tool of the present invention, the cutting head cartridge is located with respect to the shank body axially by the abutment between the upper engagement surfaces and the lower engagement surfaces, laterally by the key member and vertically by the upper surface of the step-like extension. Further since the cutting resistance is borne by the abutments between the upper abutment surfaces and between the lower abutment surfaces, by the side surfaces of the key member and by the upper surface of the step-like extension of the shank body, a high mounting rigidity is obtained. Especially the lower abutment surfaces contribute greatly to increasing the mounting rigidity in the direction of the principal component of the force exerted on the joint portion during cutting operation which tends to deflect the cutting head cartridge downwardly. Further, the side walls of the receptacle portion are not expanded in the quick-change tool of the present invention as can be seen from the above description and at the same time the side walls are reinforced by the cross bar portion connecting the side walls. Therefore, the thickness of the side walls may be relatively small for a given strength requirement, whereby the overall width of the tool can be reduced. Further the cross bar portion of the receptacle portion acts as a cover for the joint portion and prevents cuttings from entering the joint portion. In the quick-change tool disclosed in Japanese Unexamined Patent Publication No. 55(1980)-54104 which relies heavily on the resiliency of the side walls of the receptacle portion for its mounting rigidity, such a cross bar portion cannot be provided.

In one preferred embodiment of the present invention, the plug portion on the draw bar member is provided with a flat lower surface adapted to slide along a flat surface formed on the upper surface of the step-like extension of the shank body or on the upper surface of the key member. This arrangement eliminates need for additional means for preventing rotation of the draw bar member when it is slid back and forth.

DESCRIPTION OF THE PREFERRED EMBODIMENTS

Figure 1:
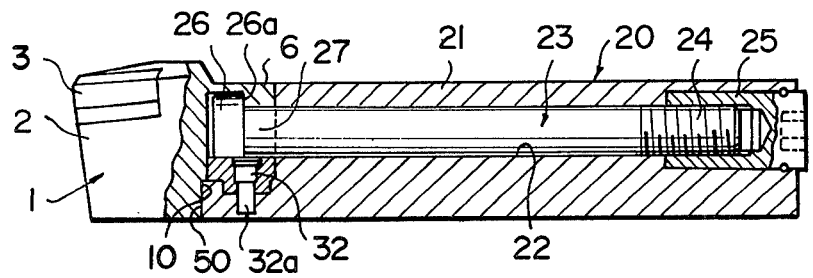
FIG. 1 is a cross-sectional side view of a quick-change tool in accordance with an embodiment of the present invention.
Figure 2:
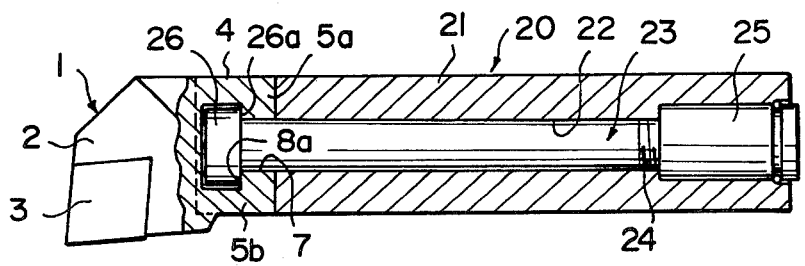
FIG. 2 is a cross-sectional plan view of the quick-change tool of FIG. 1.
Figure 3:
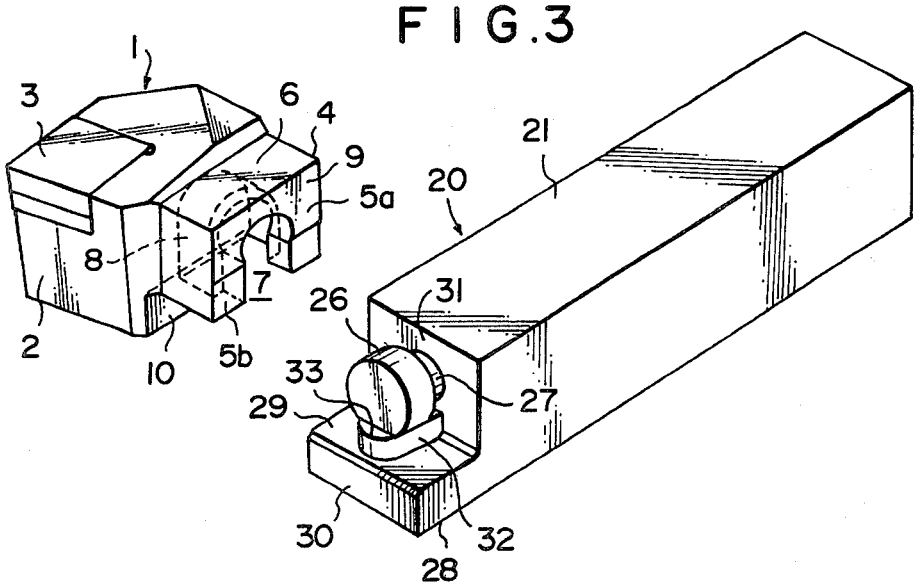
FIG. 3 is an exploded perspective view of the quick-change tool of FIG. 1.

In FIGS. 1 to 3, a quick-change tool in accordance with an embodiment of the present invention comprises a cutting head cartridge 1 and a shank assembly 20. The cutting head cartridge 1 comprises a cartridge body 2 and a cutting insert 3 supported on the cartridge body 2. The cartridge body 2 has a receptacle portion 4 on the rear end thereof. The receptacle portion 4 is like a gate in shape, and is formed of a pair of opposed side walls 5a and 5b spaced from each other and a cross bar portion 6 connecting the upper end portions of the side walls 5a and 5b. The side walls 5a and 5b and the cross bar portion 6 define an arch-like entrance 7 of the receptacle portion 4. A U-shaped cap groove 8 is formed along the inner peripheral surface of the receptacle portion 4 to extend from the lower end of the side wall 5a to the lower end of the side wall 5b via the lower surface of the cross bar portion 6. The forwardly facing rear side surface 8a of the cap groove 8 is substantially flat and extends in a vertical plane. The rear end surface of the cross bar portion 6 forms an upper abutment surface 9 which extends laterally above the entrance 7 of the receptacle portion 4. The lower rear end surface of the cartridge body 2 below the lower end of the side walls 5a and 5b of the receptacle portion 4, i.e., the part of the base of the receptacle engaging portion extending downwardly beyond the lower end of the side walls 5a and 5b forms a lower abutment surface 10 extending laterally below the entrance 7.

The shank assembly 20 comprises a shank body 21 having an axial bore 22 therethrough, and a draw bar member 23 slidably held in the bore 22. The draw bar member 23 has a threaded rear end portion 24 which is meshed with a draw nut member 25 slidably inserted into the rear end portion of the shank body 21. The draw bar member 23 is slid back and forth by rotating the draw nut member 25 in one direction or the other. The draw bar member 23 is further provided with a plug portion 26 at the front end thereof. The plug portion 26 is in the form of a flat and semicircular enlarged portion having a thickness smaller than the width of the cap groove 8 of the receptacle portion 4 and having a width larger than the width of the entrance 7 of the receptacle portion 4. The rear surface 26a of the plug portion 26 is substantially flat and adapted to be engaged with the rear side 8a of the cap groove 8 in plane-to-plane contact. The plug portion 26 is connected to the body portion of the draw bar member 23 by way of a neck portion 27 slightly thinner than the width of the entrance 7. A step-like extension 28 projects forwardly from the front end of the shank body 21 at the lower part thereof. The step-like extension 28 has a flat upper surface 29 extending substantially in a horizontal plane and a vertical front end surface which forms a lower abutment surface 30 adapted to be engaged with the lower abutment surface 10 in plane-to-plane contact as will be described hereinbelow. The front end of the axial bore 22 opens in the front end surface of the shank body 21 above the step-like extension 28 and the plug portion 26 projects forwardly from the front end of the bore 22. The part of the front end surface of the shank body 21 above the front end of the bore 22 is substantially flat and forms an upper abutment surface 31 adapted to be engaged with the upper abutment surface 9 on the rear end of the cross bar portion 6 in plane-to-plane contact as will be described hereinbelow.

A key member 32 is fixed to the upper surface 29 of the step-like extension 28 below the front end of the bore 22 by means of a screw 32a. The upper surface 33 of the key member 32 is substantially flat and extends in a horizontal plane, and the flat lower surface of the plug portion 26 rests on the upper surface 33 of the key member 32 for sliding movement therealong. The width of the key member 32 is slightly smaller than that of the entrance 7, i.e., the distance between the inner surfaces of the side walls 5a and 5b of the receptacle portion 4, so that the key member 32 can be snugly received between the side walls 5a and 5b. The upper surface 33 of the key member 32 abuts against the lower surface of the plug portion 26 to prevent rotation of the draw bar member 23 when the draw nut member 25 is rotated to feed the draw bar member 26 back and forth and to cause the draw bar member 23 to slide in response to the rotation of the draw nut member 25.

When the cutting head cartridge 1 is mounted on the shank assembly 20, the cartridge 1 is moved downwardly so that the plug portion 26 of the draw bar member 23 is received in the cap groove 8 and the neck portion 27 is received in the entrance 7 of the receptacle portion 4. Then the draw bar member 23 is drawn rearwardly by rotating the draw nut member 25 to pull the cartridge 1 rearwardly by way of the engagement between the flat rear side surface 8a of the cap groove 8 of the receptacle portion 4 and the flat rear surface 26a of the plug portion 26, whereby the cartridge 1 is pressed against the shank body 21 with the upper abutment surfaces 9 and 31 abutting against each other, the lower abutment surfaces 10 and 30 abutting against each other, the key member 32 snugly received between the side walls 5a and 5b of the receptacle portion 4 and the receptacle portion 4 resting on the upper surface 29 of the step-like extension 28 of the shank body 21 along the entire length of the receptacle portion 4.

In the quick-change tool of this embodiment, the cutting head cartridge 1 is located with respect to the shank body 21 axially by the abutment between the upper engagement surfaces 9 and 31 and the lower engagement surfaces 10 and 30, laterally by the key member 32 and vertically by the upper surface 29 of the step-like extension 28. Further since the cutting resistance is borne by the abutments between the upper abutment surfaces 9 and 31 and between the lower abutment surfaces 10 and 30, by the side surfaces of the key member 32 and by the upper surface 29 of the step-like extension 28 of the shank body 21, a high mounting rigidity is obtained. Especially the lower abutment surfaces 10 and 30 contribute greatly to increasing in the mounting rigidity in the direction of the principal component of the force exerted on the joint portion during cutting operation which tends to swing the cutting head cartridge 1 downwardly with respect to the shank body 21. Further, the side walls 5a and 5b of the receptacle portion 4 are not expanded since the engaging surfaces of the receptacle portion 4 and the plug portion 26 are flat and the drawing force of the draw bar member 23 acts in the direction perpendicular to the engaging surfaces. At the same time the side walls are reinforced by the cross bar portion connecting the side walls. Therefore, the thickness of the side walls 5a and 5b may be relatively small for a given strength requirement, whereby the overall width of the tool can be reduced. Further the cross bar portion 6 of the receptacle portion 4 acts as a cover for the joint portion and prevents chips from entering the joint portion.

Figure 4:
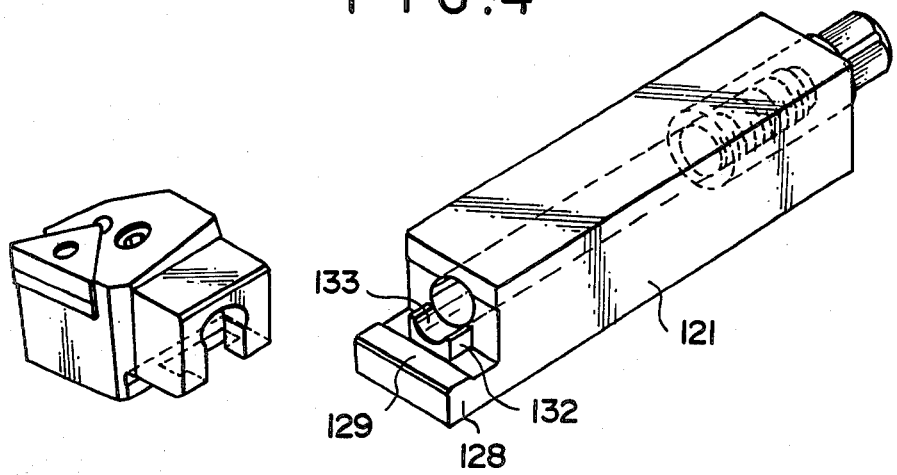
FIG. 4 is an exploded perspective view of a quick-change tool in accordance with another embodiment of the present invention with the draw bar member removed.

FIG. 4 shows a quick-change tool in accordance with another embodiment of the present invention. The quick-change tool of this embodiment is similar to the one shown in FIGS. 1 to 3 and therefore only the difference therebetween will be described here. In the embodiment of FIG. 4 the key member 132 is formed integrally with the shank body 121 and a concave upper surface 133 conforming to the lower surface of the draw bar member, which is not shown but is similar to the draw bar 23 of the embodiment of FIGS. 1 to 3. If the key member 132 is formed integrally with the shank body 121 at the neck or corner of the horizontally extending step-like extension 128 thereof as shown in the drawing, the rigidity thereof particularly resisting against the bending stress is effectively enhanced. In this embodiment the neck portion of the draw bar member extends over the concave upper surface 133 of the key member 132 and the flat lower surface of the plug portion is supported on the upper surface 129 of the step-like extension 128 of the shank body 121 in front of the key member 132. Thus in this embodiment, rotation of the draw bar member 123 is prevented by the upper surface 129 of the step-like extension 128. As in the embodiment of FIGS. 1 to 3, the key member 132 serves to locate the cartridge body 2 in the lateral direction with respect to the shank body 121. In this embodiment, the number of the parts can be reduced as compared with the embodiment of FIGS. 1 to 3.

Figure 5A:
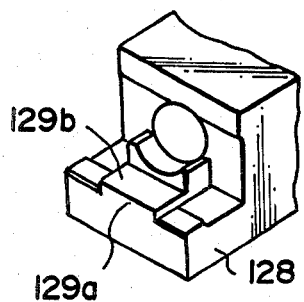
FIGS. 5A and 5B are views respectively for illustrating modifications of the embodiment of FIG. 4.
Figure 5B:
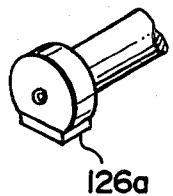

If necessary, as shown in FIG. 5A, the step-like extension 128 may be provided with an elevated portion 129a for adjusting the distance between the step-like extension and the lower surface of the plug portion. In this case the lower surface of the plug portion rests on the upper surface 129b of the elevated portion 129a. Otherwise the plug portion may be provided with an extension 126a as shown in FIG. 5B for the same purpose.

Figure 6:
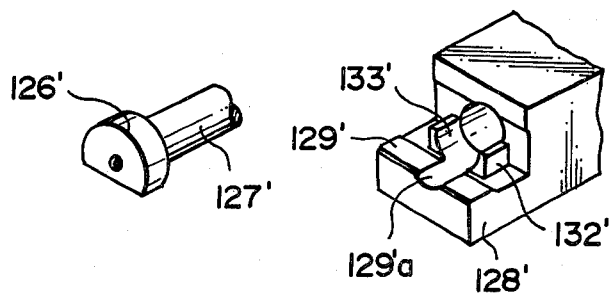
FIG. 6 shows a part of the shank body and a part of the plug engaging portion of a quick-change tool in accordance with another modification of the embodiment of FIG. 4.

In the modification of the embodiment of FIG. 4 shown in FIG. 6, the concave surface 133' of the key member 132' encroaches upon the step-like extension 128' and merges into a concave recess 129'a formed in the upper surface 129' of the step-like extension 128'. Further, the lower part of the plug portion 126' is cut away to reduce the height of thereof. Thus in this modification, the neck portion 127' of the draw bar member extends over the concave surfaces 133' and 129'a and the lower surface of the plug portion 126' rests on the upper surface 129' of the step-like extension 128' on opposite sides of the concave recess 129'a. The modification shown in FIG. 6 is especially useful to reduce the height of the tool.

In the above embodiments, the key member is on the upper surface of the step-like extension of the shank body. However, the key member may be on the front end of the step-like extension.

Figure 7:
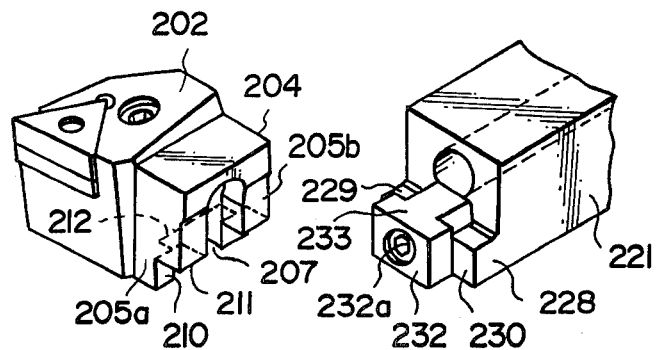
FIG. 7 is a fragmentary exploded perspective view of a quick-change tool in accordance with another embodiment of the present invention with the draw bar member removed.

In the embodiment shown in FIG. 7, the step-like extension 228 of the shank body 221 is provided with a central cutaway portion which is rectangular in shape. A T-shaped key member 232 is fitted into the cutaway portion and fixed therein by a screw 232a which is screwed into the shank body 221 in the axial direction of the shank body 221. The stem portion of the T-shaped key member 232 is inserted into the cutaway portion and the bar portion thereof abuts against the front end surface which forms the lower abutment surface 230 on opposite sides of the cutaway portion. The upper surface 233 of the key member 232 is higher than the upper surface 229 of the step-like extension 228 and is substantially flat. The lower surface of the plug portion (not shown) is slidably supported on the upper surface 233 of the key member 232. The cartridge body 202 is similar to that of the embodiment shown in FIGS. 1 to 3, but the side walls 205a and 205b are elongated and their lower surfaces are flush with the lower surface of the cartridge body 204. The lower part of each side wall is indented adjacented to the rear end surface thereof to form a rearwardly facing vertical surface 210 and a downwardly facing horizontal surface 211 which are respectively adapted to be engaged with the lower abutment surface 230 of the shank body 221 and to rest on the upper surface 229 of the step-like extension 228. That is, the vertical surfaces 210 on opposite sides of the entrance 207 form the lower abutment surface of the cartridge which is broken halfway. The cartridge body 202 is provided at the base of the receptacle portion 204 with a recess 212 which is adapted to snugly receive the bar portion of the key member 232 to laterally locate the cartridge body 202 with respect to the shank body 221.

Figure 8:
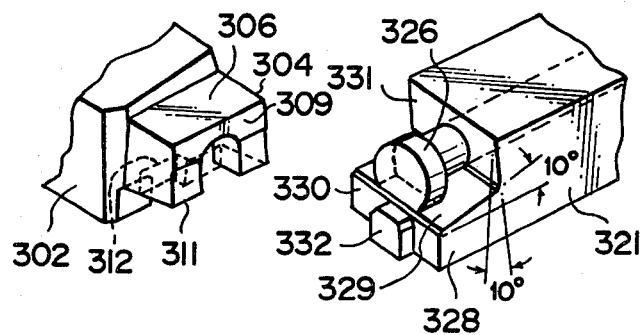
FIG. 8 is a fragmentary exploded perspective view of a quick-change tool in accordance with still another embodiment of the present invention.

FIG. 8 shows a quick-change tool in accordance with still another embodiment of the present invention. In this embodiment, the shank body 321 has a step-like extension 328 the upper surface 329 of which is rearwardly upwardly inclined with respect to the horizontal, e.g., by 10°. The plug portion 326 rests on the inclined upper surface 329. A key member 332 projects forwardly from the vertical front end surface 330 of the step-like extension 328. The key member 332 is machined out from the step-like extension 328. Similarly to the embodiment of FIG. 7, the cartridge body 302 is provided at the 25 base of the receptacle portion 304 with a recess 312 which is adapted to snugly receive the key member 332 to laterally locate the cartridge body 302 with respect to the shank body 321. The lower surfaces 311 of the side walls 305a and 305b are inclined with respect to the horizontal plane to conform to the upper surface 329 of the step-like extension 328. The front end surface of the shank body 321 is inclined forwardly with respect to the vertical, e.g., by 10°, and the rear end surface of the cross bar portion 306 is inclined with respect to the vertical to conform to the front end surface of the shank body 321, whereby inclined upper abutment surfaces 331 and 309 are respectively formed on the shank body 321 and the cartridge body 302. When the upper surface 329 is inclined, the section modulus of the step-like extension 328 is enlarged.

Figure 9:
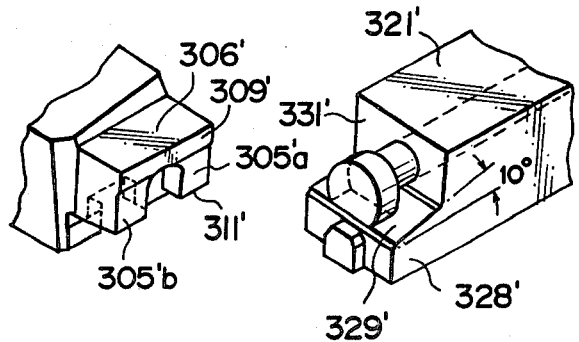
FIG. 9 is a view similar to FIG. 8 of a modification of the embodiment of FIG. 8.

In the modification shown in FIG. 9, the front end surface 331' of the shank body 321' and the rear end surface 309' of the cross bar portion 306' are vertical and the upper surface 329' of the step-like extension 328' and the lower surfaces 311' of the side walls 305'a and 305'b are inclined with respect to the horizontal.

In another modification (not shown), the front end surface of the shank body and the rear end surface of the cross bar portion are inclined and the upper surface of the step-like extension and the lower surfaces of the side walls of the receptacle portion are horizontal.

As can be seen from the description above, cuttings cannot interfere with correct location of the cartridge with respect to the shank body since the joint portion therebetween is completely closed when the cartridge is mounted on the shank body for cutting operation in the quick-change tool of the present invention. Further, since the abutment surfaces, the engaging surfaces of the engaging portions, and the side surfaces of the key member are all simple in shape, they can be machined with high accuracy and at low cost. This permits the cutting edge of the cutting insert to be indexed with respect to the workpiece with high accuracy each time the cartridge is changed.

In the hereinabove described embodiments, the shank assembly is an independent body separate from the machine tool. However, it should be noted that the shank or shank assembly described above and claimed in claims should be interpreted broadly to mean not only the ordinary shank but also the boring bar or body of the boring tool and also the tool post or turret head integrally formed with a part of the machine tool.

We claim:

1. A quick-change tool comprising a shank assembly and a cutting head cartridge detachably mounted on the shank assembly, the shank assembly comprising a shank body having an axial bore and a front end portion, and a draw bar member which has a front end having a plug portion and is slidably held in the axial bore, the cutting head cartridge comprising a cartridge body and a cutting insert fixed to the cartridge body, the cartridge body being provided with a rear end portion and having a receptacle portion adapted to receive the plug portion therein and being adapted to be mounted on the shank body, means for drawing the draw bar member backwardly with the plug portion received in the receptacle portion to pull the rear end portion of the cartridge body against the front end portion of the shank body, said shank body having a step-like extension projecting forwardly from a lower part of the front end surface of the shank body, the step-like extension having an upper surface adapted to support thereon said receptacle portion and a front end surface forming a lower abutment surface below the axial bore; a key member for laterally locating the cartridge body with respect to the shank body is provided on the step-like extension; an upper abutment surface is formed on the front end surface of the shank body above the axial bore; the plug portion is in the form of a flat enlarged portion which is connected to the body portion of the draw bar member by way of a thin neck portion and has a flat engaging surface facing rearwardly; said receptacle portion is like a gate in shape and comprises a pair of opposed side walls laterally spaced from each other and a cross bar portion connecting the upper end portions of the side walls, the side walls and the cross bar portion defining an entrance through which the neck portion connecting the plug portion to the body of the draw bar member is passed, the receptacle portion being provided with a groove which is formed along the inner surface of the side walls and the cross bar portion inside the entrance and is adapted to receive therein the plug portion from the lower end of the side walls, the rear side wall of the groove defining a flat engaging surface facing forwardly and adapted to be engaged with the engaging surface of the plug portion in plane-to-plane contact; an upper abutment surface adapted to abut against the upper abutment surface of the shank body in plane-to-plane contact is formed on the rear end surface of the cross bar portion; a lower abutment surface adapted to abut against the lower abutment surface of the shank body in plane-to-plane contact is formed on the rear side of the cartridge body; and a pair of laterally opposed wall means adapted to snugly receive therebetween the key member on the shank body to laterally locate the cartridge body with respect to the shank body is formed on the rear side of the cartridge body.

2. A quick-change tool as defined in claim 1 in which said key member is fixed to the upper surface of the step-like extension of the shank body and said pair of laterally opposed wall means are formed by the pair of side walls of the receptacle portion.

3. A quick-change tool as defined in claim 2 in which the upper surface of said key member is substantially flat and said plug portion has a substantially flat lower surface, the lower surface of the plug portion being slidably supported on the upper surface of the key member to prevent rotation of said draw bar member.

4. A quick-change tool as defined in claim 2 in which said plug portion has a substantially flat lower surface which is slidably supported on the upper surface of the step-like extension in front of said key member to prevent rotation of the draw bar member.

5. A quick-change tool as defined in claim 4 in which said key member has a concave upper surface, and said neck portion of the draw bar member is received in the concave upper surface.

6. A quick-change tool as defined in claim 5 in which said key member is formed integrally with the step-like extension.

7. A quick-change tool as defined in claim 2 in which said lower abutment surface of the cartridge body is formed on the part of the base of the receptacle portion extending downwardly beyond the lower surface of the side walls of the receptacle portion, and the receptacle portion is adapted to rest on the upper surface of the step-like extension over the entire axial length of the side walls on opposite sides of the key member when the draw bar member is drawn rearwardly to fix the cartridge body to the shank body.

8. A quick-change tool as defined in claim 7 in which said lower surface of the side walls of the receptacle portion is flat and the upper surface of the step-like extension is flat.

9. A quick-change tool as defined in claim 7 in which said lower abutment surfaces of the cartridge body and the shank body are laterally elongated vertical surfaces.

10. A quick-change tool as defined in claim 2 in which said upper abutment surfaces of the cartridge body and the shank body are laterally elongated vertical surfaces.

11. A quick-change tool as defined in claim 1 in which said key member is fixed to the front end surface of the step-like extension thereby dividing the lower abutment surface into two parts on opposite sides thereof, and said pair of wall means is in the form of opposed side walls of a recess formed in the base of the receptacle portion, said lower abutment surface of the cartridge body being divided into two parts by the recess.

12. A quick-change tool as defined in claim 11 in which said key member is a T-shaped member having a bar portion and a stem portion perpendicular to the bar portion, and the T-shaped key member is fixed to the step-like extension with the stem portion being snugly received in a central cutaway portion formed in the step-like extension from the front end surface thereof to the front end surface of the shank body and with the bar portion abutting against the front end surface of the step-like extension on opposite sides of the central cutaway portion, the upper surface of the T-shaped key member being flat and higher than the upper surface of the step-like extension, said plug portion having a flat lower surface and the lower surface being supported on the upper surface of the key member, and the lower surfaces being adapted to rest on the upper surface of the step-like extension on opposite sides of the bar portion of the key member when the draw bar member is drawn rearwardly to fix the cartridge body to the shank body.

13. A quick-change tool as defined in claim 11 in which said key member is formed integrally with the step-like extension to project forwardly therefrom and the lower surface of the plug portion is slidably supported on the upper surface of the step-like extension to prevent rotation of the draw bar member.

14. A quick-change tool as defined in claim 13 in which said upper surface of the step-like extension is inclined upwardly toward the front end surface of the shank body and the lower surfaces of the side walls of the receptacle portions are inclined to conform to the upper surface of the step-like extension.

15. A quick-change tool as defined in claim 13 in which said upper abutment surfaces of the shank body and the cartridge body are forwardly inclined with respect to the vertical.

16. A quick-change tool as defined in claim 1 in which each of said upper and lower abutment surfaces is a laterally elongated vertical surface.

17. A quick-change tool as defined in claim 1 in which said plug portion is semicircular in shape with a flat lower surface and said groove of the receptacle portion is of an inverted U-shape having a rounded upper portion conforming to the upper part of the semicircular plug portion.

* * * * *